United States Patent
Swanson et al.

[11] Patent Number: 5,269,726
[45] Date of Patent: Dec. 14, 1993

[54] CONTROL SYSTEM AND STRATEGIES FOR A DOUBLE ACTING SECONDARY SHEAVE SERVO FOR A CONTINUOUSLY VARIABLE TRANSMISSION

[75] Inventors: Glenn E. Swanson, Lansing; Alan L. Miller, Ithaca, both of N.Y.; William J. Haley, Chippewa Falls, Wis.

[73] Assignee: Borg-Warner Automotive, Inc., Sterling Heights, Mich.

[21] Appl. No.: 917,867

[22] Filed: Jul. 21, 1992

Related U.S. Application Data

[63] Continuation-in-part of Ser. No. 721,285, Jun. 26, 1991.

[51] Int. Cl.⁵ .............................................. F16H 59/00
[52] U.S. Cl. ................................ 474/28; 474/30; 474/70
[58] Field of Search ................... 474/28, 18, 25, 29

[56] References Cited

U.S. PATENT DOCUMENTS

| | | | |
|---|---|---|---|
| 4,313,730 | 2/1982 | Cole, Jr. et al. | 474/201 |
| 4,433,594 | 2/1984 | Smirl | 74/689 |
| 4,507,106 | 3/1985 | Cole, Jr. | 474/215 |
| 4,522,086 | 6/1985 | Haley | 74/867 |
| 4,674,363 | 6/1987 | Miyawaki | 474/18 X |
| 4,702,725 | 10/1987 | Kouno et al. | 474/28 |
| 4,753,627 | 6/1988 | Kawamoto | 474/18 |
| 4,767,384 | 8/1988 | Moan | 474/28 |
| 4,850,938 | 7/1989 | Yamada | 474/28 |
| 4,854,920 | 8/1989 | Mimura | 474/28 |
| 4,904,229 | 2/1990 | Hattori | 474/28 X |
| 4,982,822 | 1/1991 | Petzold et al. | 474/28 X |
| 5,006,092 | 4/1991 | Neuman et al. | 474/8 |
| 5,046,991 | 9/1991 | Friedmann | 474/28 X |
| 5,048,371 | 9/1991 | Hendriks | 74/730.1 |

Primary Examiner—Ramon S. Britts
Assistant Examiner—Roger J. Schoeppel
Attorney, Agent, or Firm—Willian Brinks Olds et al.

[57] ABSTRACT

A system and several strategies for controlling a continuously variable transmission with an improved secondary servo arrangement in order to efficiently provide sufficient clamping forces under high torque conditions. The valving means allowing for the relative movement of the second variable pulley's movable sheave includes a valving arrangement operative to regulate the secondary apply pressure at or below the hydraulic source pressure and distinct from the primary line pressure. Control signals are developed to prevent belt slip and to efficiently launch a vehicle, maintain the necessary primary to secondary clamping force ratio in overdrive conditions, and avoid overpressurization of the secondary servo for many vehicle operating conditions.

7 Claims, 9 Drawing Sheets

CONTROL SYSTEM AND STRATEGIES FOR A DOUBLE ACTING SECONDARY SHEAVE SERVO FOR A CONTINUOUSLY VARIABLE TRANSMISSION

This is a continuation-in-part of U.S. Ser. No. 07/721,285, filed Jun. 26, 1991, entitled "Double Acting Secondary Sheave Servo for a Continuously Variable Transmission." The entire disclosure of the foregoing application is incorporated herein by reference.

This application is related to Ser. No. 07/748,695, filed Aug. 22, 1991, now U.S. Pat. No. 5,180,339 which is a division of Ser. No. 07/721,285, filed Jun. 26. 1991.

BACKGROUND OF THE INVENTION

1. Field of the Invention

The present invention relates to continuously variable transmissions, and, more particularly, to control systems and strategies for continuously variable transmissions which include a double acting secondary sheave servo. The system and strategy provides sufficient clamping force at lower transmission ratios, avoids over-pressurizing the secondary servo, uses pressures at or below those found in conventional continuously variable transmission secondary servos, and thereby makes it easier to achieve the desired primary to secondary ratio.

2. Description of the Prior Art

A continuously variable transmission (CVT) utilizes a pair of adjustable or variable pulleys mounted on a pair of shafts, and an endless belt intercoupled therebetween, to transmit torque from an input source, such as an engine, to an output, such as a vehicle driveline. Each pulley has at least one sheave that is axially fixed and another sheave that is axially movable relative to the first. A flexible belt of metal or elastomeric material interconnects the pulleys.

The inner faces of the sheaves of the pulleys are bevelled or chamfered so that movement of the axially displaceable sheave relative to the fixed sheave adjusts the distance between the sheaves and, thus, the effective pulley diameter. The first pulley, or primary pulley, is mounted on a primary or input shaft and is driven by the engine through a torque converter or start clutch. The second pulley, or secondary pulley, is mounted on a secondary or output shaft and the output of the secondary shaft drives the drive train of the vehicle. The drive train is typically connected to the secondary shaft through a clutch. U.S. Pat. No. 4,433,594, entitled "Variable Pulley Transmission", provides further information regarding CVTs and is incorporated herein by reference in terms of background to the present invention.

The primary and secondary variable pulley systems include servo systems for movement of the pulley sheaves. The displaceable sheave of each pulley includes an annular chamber for receiving fluid to move the sheave and thus change the effective pulley diameter. Increasing the fluid in the chamber increases the effective diameter of the pulley. As fluid is exhausted from the chamber, the pulley diameter is decreased. The effective diameter of the primary pulley is moved in one direction as the effective diameter of the secondary pulley is moved in the other direction.

The movement of the sheave of the primary pulley servo regulates the transmission ratio across the CVT. The movement of the sheave of the secondary pulley servo regulates the clamping force on the belt connecting the primary and secondary pulleys. Sufficient clamping force is therefore necessary to prevent damage that might result from slippage of the belt.

The sufficiency of secondary sheave clamping force becomes especially problematic in high torque applications, because certain designs of conventional CVT's that can provide the necessary clamping force will thereby have insufficient output torque or inadequate range of vehicle drive ratios (such a wide range is desirable for providing fuel efficient overdrive ratios). For example, at launch of a vehicle there is a need for high wheel torque, and at a very slow vehicle speed there is a need for a low transmission ratio and high torque. This need is complicated by the low torque supplied by the engine at low engine speeds. To maximize launching torque, a torque converter may be inserted between the engine output and CVT input to multiply the starting torque at launch. This torque converter can then be locked up at high vehicle speeds thereby having no effect at the CVT's high speed transmission ratio. Unfortunately, the torque multiplication provided by the torque converter increases the secondary clamping force required to prevent belt slippage.

The output torque of the CVT and the effective radius of the primary sheave thus are factors determining the necessary clamping force at the secondary sheave to prevent belt slippage. At vehicle launch, the necessary high output torque and small effective radius of the primary sheave requires the secondary servo clamping force to be at its highest.

Another factor determining the necessary clamping force becomes more important after vehicle launch. This is the centrifugal force of the rotating oil within the servo, which increases with the square of the angular velocity of the sheave and the fourth power of the sheave radius, and can cause excessive belt clamping force at high secondary pulley angular velocities. In a single secondary, a balance can is placed typically adjacent to the servo and counteracts this centrifugal force. The balance is typically open to atmosphere and kept filled with oil either through an orifice in the apply servo or from an external source, and therefore only reduces the belt clamping force by way of the centrifugal force of the oil in the balance can.

The centrifugal effects also contribute to transmission inefficiency because such forces can make it difficult or impossible to obtain the required primary to secondary belt clamping force ratio necessary to maintain a desired transmission ratio, and in any event there is the likely result of over-pressurizing the primary and secondary servos. Thus, for example, when a vehicle is at a speed allowing for an overdrive ratio, the secondary clamping force is thereby at a high level, and the primary must be even greater to obtain the clamping force ratio necessary to maintain the desired transmission ratio in overdrive. Moreover, the centrifugal effects also can be problematic at high vehicle speeds when downshifting is required because the centrifugal forces are opposed to attempts at altering the effective secondary pulley diameter required for downshifting.

Thus, the operation of secondary servos, both at launch, during upshift, overdrive, and downshift, in high torque applications necessarily involves high pressures that can cause inefficiency, noise, and mechanical problems to the hydraulic pump providing the source pressure to the system as well as other mechanical difficulties in the system.

Heretofore, efforts have been made to provide sufficient clamping force to a secondary sheave in high torque applications, such as when a torque converter is placed between the engine output and the CVT input. One such effort described in U.S. Ser. No. 07/721,285, filed Jun. 26. 1991, now U.S. Pat. No. 5,180,339 utilizes a double acting secondary servo with a plurality of fluid chambers in order to increase the application of fluid pressure, and a balance cavity between two servo areas, allowing for the required clamping forces necessary to operate the CVT. However, control arrangements in the prior art are not suitable for optimum regulation of such a CVT. The present invention is an attempt to provide a control system and strategy capable of controlling belt clamping by the aforementioned secondary servo to a level that allows for the most efficient operation of the CVT. While control strategies for secondaries are known in the prior art, the present invention utilizes the aforementioned double-acting secondary servo in an attempt to address the above-described problems.

SUMMARY OF THE INVENTION

The present invention is directed to a system and a plurality of control strategies for controlling a continuously variable transmission with an improved secondary servo arrangement in order to efficiently provide sufficient clamping forces under high torque conditions. The present invention therefore provides sufficient clamping forces at launch to avoid damaging the CVT components, yet avoids excessive pressures in the secondary servo during CVT operation and thus allows for CVT control at conventional line pressures thereby avoiding mechanical system failures inherent in high hydraulic pressure systems.

In accordance with one embodiment of this invention, a continuously variable transmission system is provided to allow the transmission of torque from a torque input means to a torque output means. The transmission includes rotatable input and output shafts and drive means for drivingly coupling the input shaft with the output shaft. The drive means includes a first variable pulley means rotatable with the input shaft, a second variable pulley means rotatable with the output shaft, and an endless chain or belt coupling the first and second variable pulleys. Each of the first and second variable pulleys has a fixed and a movable sheave, as well as biasing means for continuously biasing together the fixed and movable sheaves of each variable pulley. The biasing means for the first variable pulley includes at least one fluid chamber having fluid access to a source of pressurized hydraulic fluid via a primary line. The biasing means for the second variable pulley includes a plurality of fluid chambers having fluid access to a source of pressurized hydraulic fluid by way of valving means communicating with a secondary line. The secondary line valving means, in one preferred embodiment, includes a control solenoid operatively connected to a bypass valve and a regulator valve, with the bypass valve supplied by the secondary line and responsive to a control signal from the solenoid, allowing a feedback pressure signal to the regulator valve. The regulator valve in this preferred embodiment is supplied with hydraulic source pressure, and responsive to a control signal from the solenoid in conjunction with the secondary line feedback signal fed via the bypass valve, regulates the secondary line pressure at or below the hydraulic source pressure and distinct from the primary line pressure. Through addition and exhaustion of fluid from the fluid chambers thereby, relative movement from a first position to a second position of the movable sheave is efficiently permitted.

The present invention also provides a plurality of control strategies or methods for controlling the secondary pulley clamping force. In accordance with one embodiment of the present invention, a control system utilizes a continuously variable transmission with a primary and secondary coupling means, with the secondary coupling means having a secondary line in fluid communication with the secondary coupling means and the secondary coupling means also including a balancing means having an intermediate line in fluid communication with the balancing means, and the primary coupling means having a primary line in fluid communication therewith, and a general pressure line from the hydraulic fluid source in fluid communication with the primary line, secondary line, and intermediate line. A control system for this CVT for controlling the clamping force of the secondary coupling means includes means for ascertaining a required secondary line pressure for the input torque, drive ratio, engine speed, downshift strategy employed, and pressure of the secondary balance means; means for ascertaining a required primary line pressure for the input torque, drive ratio, engine speed, and downshift strategy employed in the continuously variable transmission; means for substantially setting the general line pressure to the required primary line pressure responsive to said required primary line pressure greater than or equal to said required secondary pressure; and means for substantially setting the secondary line pressure to the required secondary line pressure responsive to said required primary line pressure greater than or equal to said required secondary line pressure.

In accordance with another embodiment of the present invention, a control system for controlling the secondary clamping force of the previously described CVT of the foregoing paragraph includes means for ascertaining a required secondary line pressure for the input torque, drive ratio, engine speed, downshift strategy employed, and pressure of the secondary balance means; means for ascertaining a required primary line pressure for the input torque, drive ratio, engine speed, and downshift strategy employed; and means responsive to the required secondary line pressure greater than the required primary line pressure for substantially setting the general line pressure to the required secondary line pressure and means for substantially setting the secondary line pressure to the general line pressure.

These embodiments may include means for ascertaining a required secondary line pressure for the input torque, drive ratio, engine speed and downshift strategy employed; means for comparing this required secondary line pressure with a secondary switching pressure setpoint to assure that the control system does not require pressures exceeding the maximum pressure for the hydraulic system; means responsive to the required secondary line pressure greater than the secondary switching pressure setpoint for exhausting the balance means pressure; means responsive to the required secondary line pressure greater than the secondary switching pressure setpoint for setting the general line pressure to the secondary line pressure; and means responsive to the required secondary line pressure greater than the secondary switching pressure setpoint for setting the secondary line pressure to the general line pressure.

BRIEF DESCRIPTION OF THE DRAWINGS

For a more complete understanding of this invention, reference should now be made to the embodiments illustrated in greater detail in the accompanying drawings and described by way of example only. In the drawings.

DETAILED DESCRIPTION OF THE INVENTION

Figure 1:
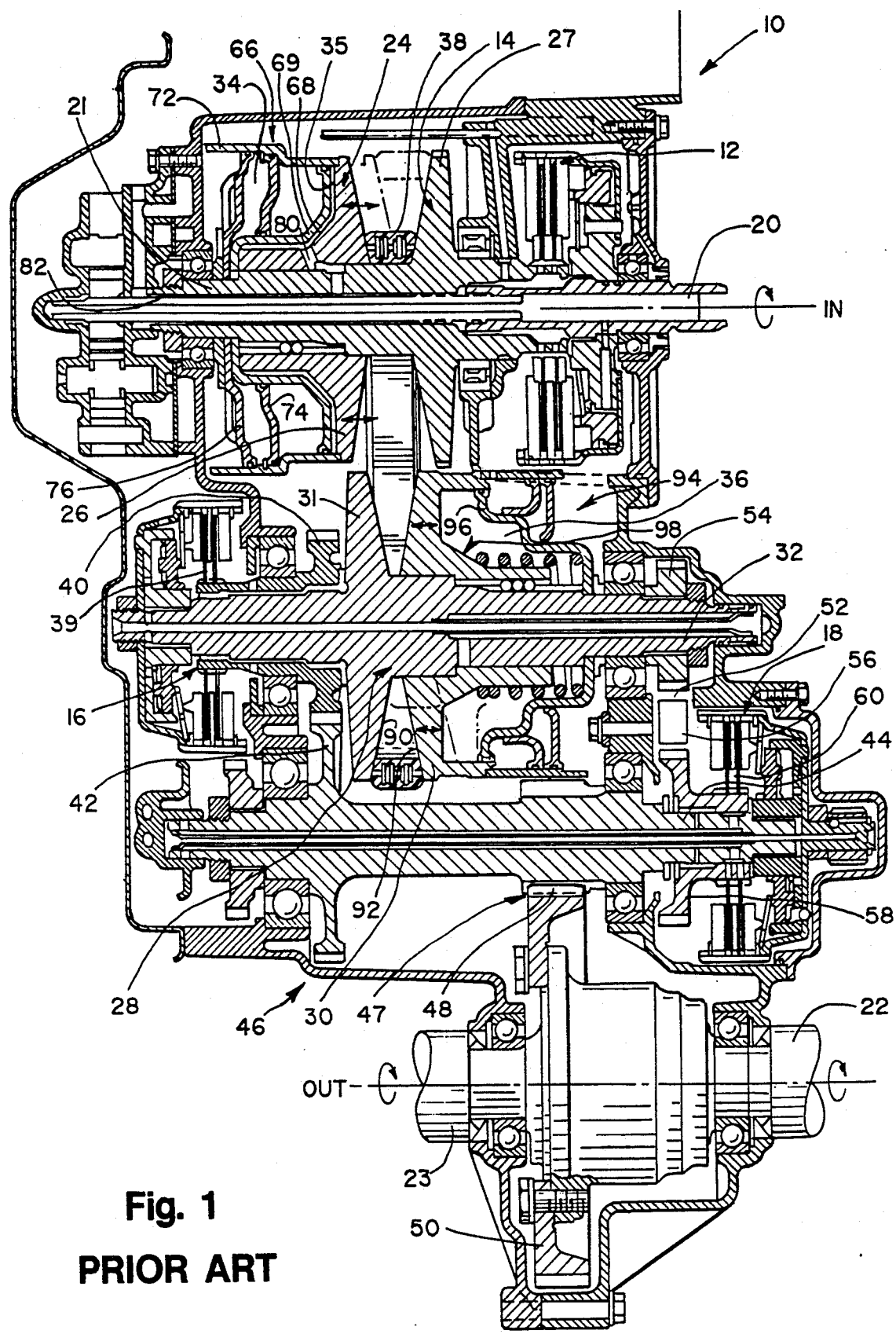
FIG. 1 is a sectional view of a conventional continuously variable transmission of the prior art, illustrating the environment of the present invention.

Referring to the drawings, FIG. 1 illustrates a compact arrangement for a continuously variable transmission (CVT) known in the prior art. The details of the structure of this CVT are set forth in U.S. Pat. No. 5,006,092, which is incorporated herein by reference. The details of this conventional CVT will be described to the extent necessary to provide the environment for an understanding of the present invention.

The CVT is illustrated generally at 10 in FIG. 1, and it includes a slippable start clutch that is located upstream of a belt and sheave system, shown generally at 14. The slippable start clutch may be utilized in place of a torque converter. Non-dynamic forward and reverse clutches 16, 18 are situated downstream of the belt and sheave system. This system of clutches 12, 16, 18 may be included in the CVT, as desired, but does not form a part of the present invention.

The continuously variable transmission includes an input shaft 20 and a primary shaft 21 for the input of torque from the engine to the transmission and a pair of output shafts 22, 23 for the output of torque from the transmission to the vehicle drive wheels. A first variable pulley 24 having a first movable sheave 26 and a first fixed sheave 27 is disposed on the shaft 21. A second variable pulley 28 having a second movable sheave 30 and a second fixed sheave 31 is disposed on a secondary shaft 32. First servo chambers 34, 35 receive fluid to force movement of the first movable sheave 26 and a second servo chamber 36 receives fluid to force movement of the second movable sheave 30.

The first and second pulleys 24, 28 are coupled by an endless belt 38. The flexible belt can be of metal or elastomeric construction, as known in the art. Transmission belts suitable for use in CVT's are shown in U.S. Pat. Nos. 4,313,730 and 4,507,106, which also are hereby incorporated by reference.

The start clutch 12 is located between the input shaft 20 and the primary shaft 21. The start clutch acts to transmit torque from the shaft 20 to shaft 21. In the drawings, the start clutch is shown as a fluid-actuated slippable clutch, but it can also be a torque converter or other fluid coupling means or an electric particle clutch between the engine and the input shaft.

The ratio of the continuously variable transmission 10 is controlled by the pressure of the fluid supplied to the primary servo chambers 34, 35 and the secondary servo chamber 36. The pressure in the primary servo chambers 34, 35 moves the first movable sheave 26 to regulate the ratio between the shaft 21 and the secondary shaft 32. The pressure supplied to the second servo chamber 36 moves the second movable sheave to regulate the clamping force on the belt to prevent slippage. As described below, the present invention is primarily directed to controlling an embodiment of a secondary servo chamber.

Downstream of the belt and sheave system 14, the forward clutch 16 is disposed on the first intermediate shaft 32 and the reverse clutch 18 is disposed on a countershaft 44. Engagement of the forward and reverse clutches causes, through a series of gear members, the transmission output shafts 22, 23 to rotate in forward and reverse directions. A forward gearing system 46, which includes a drive gear 40 and a driven gear 42, is coupled for rotation with the movable clutch plate 39 of the forward clutch 16. The countershaft 44 is coupled to the output shafts 22, 23 through an output gear system 47 that includes a drive gear 48 and a driven gear 50. A reverse gearing system 52, which includes a drive gear 54, an idler gear 56 and a driven gear 58, couples the countershaft 44 to the movable clutch plate 60 of the reverse clutch 18.

FIG. 1 also illustrates the details of the conventional primary and secondary sheave servos. The primary sheave system, and particularly the movable sheave flange 24, has a double-acting primary servo generally indicated at 66 including a piston surface 68 and a reaction plate 69, joined by cylinder means. Substantially fluid tight annular cylinders 34, 35 are defined by the telescoping outer sleeve 72 and the inner plates 74, 76, the reaction plate 69, and the piston surface 68.

Hydraulic fluid is delivered to the cylinders 34, 35 by a primary line, and its pressure is regulated by a fluid supply system which communicates via the primary line and through port 80 to a general pressure line and hydraulic fluid supply system including a fluid pump (not shown in FIG. 1). The port 80 communicates between the cylinders 34, 35 and the annular recess 82, which encircles the shaft 22. Thus, the rotating reservoir of the cylinders 34, 35 communicates with a stationary source of pressurized hydraulic fluid.

The secondary pulley 28 of the transmission shown in FIG. 1 is, for the most part, comparable to the primary pulley 24. The secondary pulley 28 includes sheave flanges 90 and 92. The surfaces of the sheave flanges 90, 92 define a groove of the secondary pulley 28 for location of the belt 38.

The secondary servo generally indicated at 94 controls the position of the movable sheave 30. The primary purpose of the secondary servo 94 is to provide a sufficient clamping force to prevent the belt 38 from slipping. The servo 94 comprises a hydraulic fluid cylinder 36 having an annular reservoir. The reservoir is defined and enclosed by an outer sleeve 96 and the piston surface 98. The reservoir communicates with a source of pressurized fluid.

FIG. 1 illustrates the variation of the transmission ratio of the CVT. In FIG. 1, the CVT is at its lowest ratio because the sheave 24 has essentially its minimum effective radius and the sheave 28 has effectively its maximum effective radius. The flanges of the sheave 24 set the desired ratio for the belt 38. The secondary sheave 28 provides the necessary tension in the belt 38 to prevent it from slipping on either sheave. The sheave 24 and input shaft 20 thus rotate much faster than the secondary sheave 28 and the secondary shaft 32. If a torque converter is used, it operates to multiply the torque provided from the engine to the input shaft 20.

The belt 38 of FIG. 1 is illustrated in phantom lines for the situation when the CVT has been "shifted" or varied by increasing the force between the flanges of the first sheave 24. This increases the effective radius of the sheave 28 by urging the belt 38 radially outward and to the right as shown in FIG. 1. This shift of the belt 38 on the primary sheave 24 draws the portion of the belt 30 trained on the secondary sheave 28 inward and to the right as shown in FIG. 1. The shift of the belt 38 pushes the surfaces 90 and 92 apart, opening the groove and thus reducing the effective radius of the secondary sheave 28. Meanwhile, the secondary servo 94 maintains a sufficient clamping force on the belt 38, applied at the surfaces 90 and 92, to prevent the belt 38 from slipping.

Figure 2:
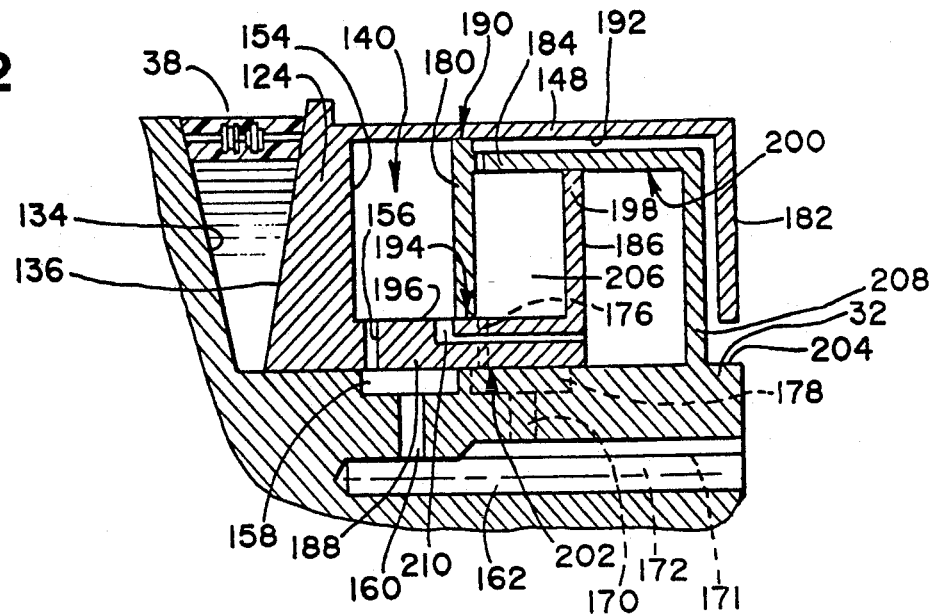
FIG. 2 is a schematic half-sectional detail view, taken through the center axis of one embodiment of a double acting secondary servo, configured to provide a CVT with its lowest transmission ratio.
Figure 3:
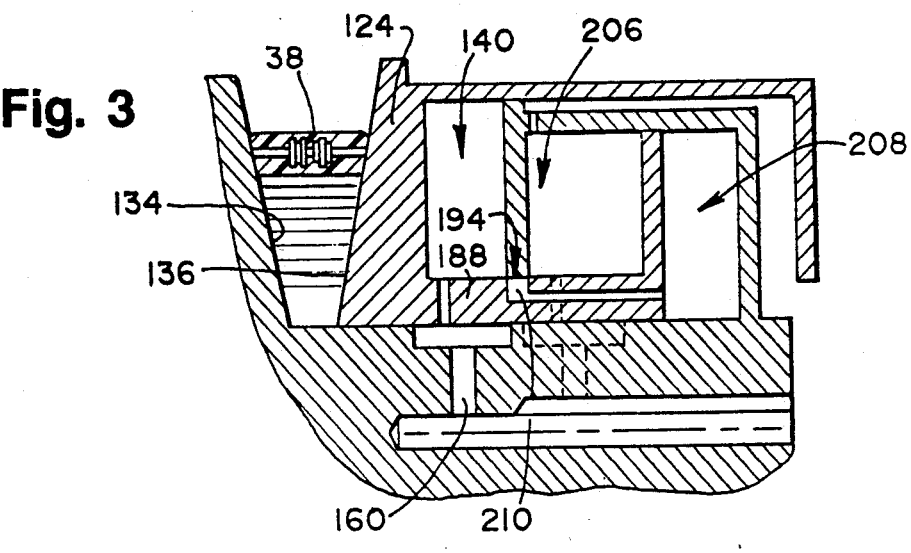
FIG. 3 is a view of the secondary servo of FIG. 2 configured to provide a CVT with an intermediate transmission ratio.
Figure 4:
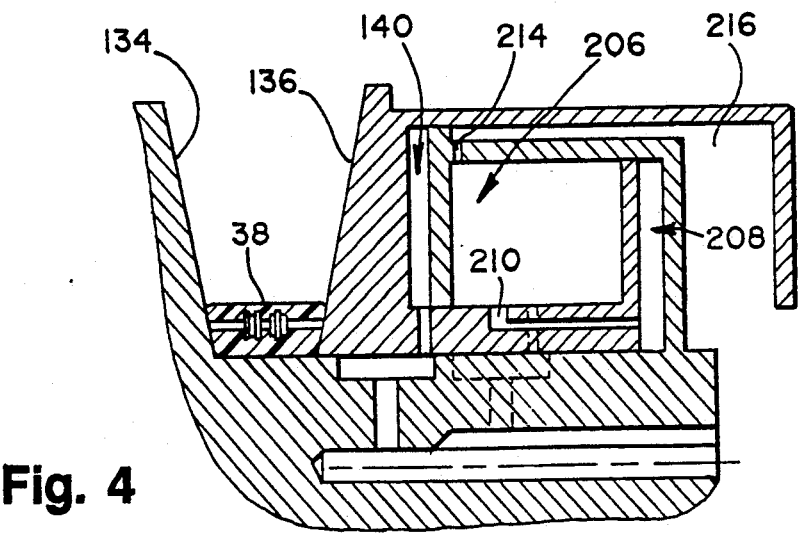
FIG. 4 is a view of the secondary servo of FIG. 2 configured to provide a CVT with its highest transmission ratio.

FIGS. 2 through 4 show a first embodiment of an improvement to the secondary servo 94. Here, sheave flange 124 includes a piston surface 154 which defines part of a first fluid chamber 140. Fluid is inputted into chamber 140 by means of a conduit comprising port 156, annular recess 158, port 160, and axial bore 162 of the secondary shaft, which is operatively connected to the hydraulic system via the secondary line (not shown in FIG. 2 but discussed further below). The axial dimension of annular recess 158, when positioned with port 156, causes the recess to remain in fluid communication with the port for all positions of sheave flange 124. Fluid pressure within first chamber 140 biases the piston surface 154, and thus sheave surface 136, toward the surface 134. An outer sleeve 148 extending axially from sheave flange 124 defines an upper portion of chamber 140.

The embodiment of FIGS. 2 through 4 includes the axially fixed, axially spaced first and second reaction plates 180 and 182, which in this simplified embodiment are shown as integral with the secondary shaft. In this embodiment reaction plates 180, 182 are carried on secondary shaft 32 on the same side of the secondary sheave as piston surface 154. The reaction plates 180, 182 are joined by an axially extending sleeve 184. The apparatus further comprises piston plate 186, which here is a radial extension of sleeve 188.

The first reaction plate 180 is axially fixed and has upper periphery 190 slidable axially in substantially sealed relation along the inner cylindrical surface 192 of sleeve 148. First reaction plate 180 also has a lower periphery 194, with respect to which the outer cylindrical surface 196 is axially slidable in substantially sealed relation. Thus, the four surfaces of the piston surface 154, the first reaction plate 180, the inner cylindrical surface 192, and the outer cylindrical surface 196 define the reservoir of the first chamber 140.

The piston plate 186 is axially movable, and has an upper periphery 198 slidable in substantially sealed relation to the inner cylindrical surface 200 of sleeve 184. Piston plate 186 has an inner periphery 202 which merges with the inner periphery of inner sleeve 188, and which is slidably engaged in a substantially sealed relation to the cylindrical outer surface 204 of secondary shaft 32. The four surfaces of the reaction plate 180, piston plate 186, inner cylindrical surface 200, and outer cylindrical surface 196 define the reservoir of second fluid chamber 206.

Fluid may be inputted into second chamber 206 by means of a conduit comprising port 176, annular recess 178, port 170, and axial bore 172 of the secondary shaft which is separated from axial bore 162 by a tubular member 171, which is operatively connected to the hydraulic system via the balance line (not shown in FIG. 2 but discussed further below). The axial dimension of annular recess 178, when positioned with port 176, causes the recess to remain in fluid communication with the port for all positions of sheave flange 124. Alternatively, the fluid connection between the second chamber 206 may comprise either a tubular connection or a series of conduits for fluid passage within the transmission casing, as used in the art for fluid passage to enable distinct pressures between the first chamber 140 and second chamber 206.

Second reaction plate 182 is sealed to, and here shown as integral with, sleeve 184 and cylindrical outer surface 204 as previously defined. Piston plate 186, reaction plate 182, outer cylindrical surface 204 and inner cylindrical surface 200 define the reservoir of a third fluid chamber 208.

Inner sleeve 188 has a generally L-shaped conduit 210 which does not communicate with port 176, having a radially extending leg and an axially extending leg, which transfers fluid from the third chamber 208 to the first chamber 140 under certain circumstances, and to the second chamber 206 in other circumstances. These circumstances are illustrated in FIGS. 2, 3, and 4.

In FIG. 2, the effective diameter of the secondary pulley is near its maximum, so belt 38 is near the outside of the groove between the inner surfaces 134 and 136. Thus, sheave flange 124 is fully displaced axially to the left in FIG. 2 so that the surface 136 is near its closest proximal point to the surface 134. At the same time, conduit 210 provides a fluid connection between first chamber 140 and third chamber 208. Thus, fluid is delivered to chambers 140 and 208 simultaneously, at nearly equal pressures (apart from a slight pressure drop through port 210), from the hydraulic system by the described porting.

The clamping force urging sheave flange 124 to the left (as shown in FIG. 2) includes the pressure generated by fluid in first chamber 140 and third chamber 208, which comprise the secondary pressure apply areas. As FIG. 2 illustrates, a large clamping force is exerted by the pressure apply areas of the first and third chambers on sheave flange 124 at this low-ratio limit to prevent belt 38 from slipping between the surfaces 134 and 136.

FIG. 3 shows sheave flange 124 shifted axially to an intermediate position (between those shown in FIGS. 2 and 4). Belt 38 has moved radially inward between the surfaces 134, 136 to remain in engagement with them, so the transmission has a higher ratio than FIG. 2. Radial port 210 is beneath inner periphery 194 of first reaction plate 180, and thus closing conduit 210 between first chamber 140 and third chamber 208. In this position, fluid remains within chamber 208, but isolated from communication with first chamber 140.

As sheave 124, and thus sleeve 188, shifts further distally, as shown in FIG. 4, second and third chambers 206, 208 are brought into communication by conduit 210. The hydraulic fluid in third chamber 208 thus is directed into the second chamber 206, or balance cavity. Fluid may be removed from second chamber 206 by port 214 to fill centrifugal balance can 216 and, when it overflows the balance can, it is returned to a sump (not shown in FIG. 4 but discussed further below) for reuse. Alternatively, fluid may be added or removed by way of port 176 in communication with the balance line (not shown in FIG. 4). In this way fluid in the second chamber acts as a centrifugal balance.

When sheave flange 124 is at or near its high ratio or distal limit of axial travel, as illustrated in FIG. 4, the externally-applied fluid pressure in second and third chambers 206 and 208 is relatively unpressurized. First chamber 140 then acts alone to provide a clamping force on belt 38. However, centrifugal pressure is still present in the second and third chambers on account of the rotating oil. The centrifugal force from the rotating hydraulic fluid in chambers 140, 206, and 208 increases with the rate of rotation. The centrifugal effect of chamber 206 is intended to cancel the effect of chamber 208. Similarly balance can 216 is intended to cancel the centrifugal effect of chamber 140.

When the transmission is at its low ratio limit, as illustrated in FIG. 2, essentially zero fluid apply pressure is applied in second chamber 206 (due to no fluid introduction via port 176 and escape of fluid through port 214) and the fluid pressures in chambers 140 and 208 are substantial. Fluid control means, described in detail below, is provided for reducing the pressure in third chamber 208 relative to the pressure in second chamber 206 when sheave flange 124 shifts toward its high ratio limit shown in FIG. 4. As a result, in the apparatus of FIGS. 2 through 4, a substantially greater clamping force is applied (for a given fluid pressure) in the low ratio configuration of FIG. 2 than the high ratio configuration of FIG. 4.

The clamping force applied in FIGS. 2 through 4 is a force tending to shift or bias sheave flange 124 to the left, but FIGS. 2-4 show that sheave flange 124 actually shifts to the right as the speed of secondary shaft 32 increases. Because of centrifugal effects, sheave 124 actually follows belt 38, instead of the reverse relation. Thus, at higher secondary shaft speeds the pressure conveyed to first and third chambers 140 and 208 counteracts the shifting of sheave flange 124, rather than driving it and the pressure conveyed to the second chamber 206 may drive sheave flange 124.

Figure 5:
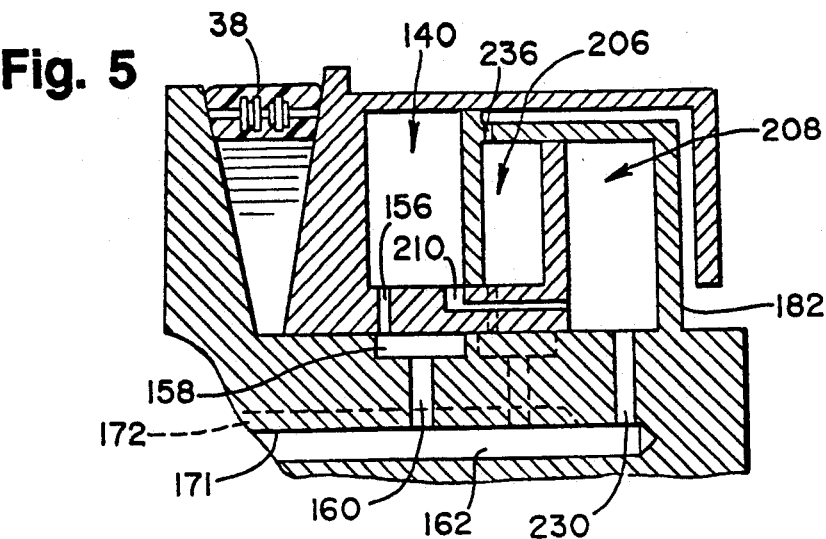
FIG. 5 is a schematic half-sectional detail view, taken through the center axis of another embodiment of a double acting secondary servo, configured to provide a CVT with its lowest transmission ratio.
Figure 6:
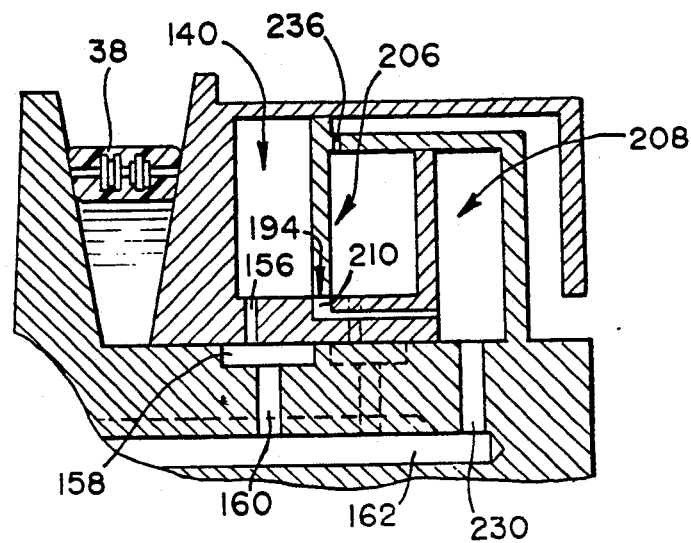
FIG. 6 is a view of the secondary servo of FIG. 5 configured to provide a CVT with an intermediate transmission ratio.
Figure 7:
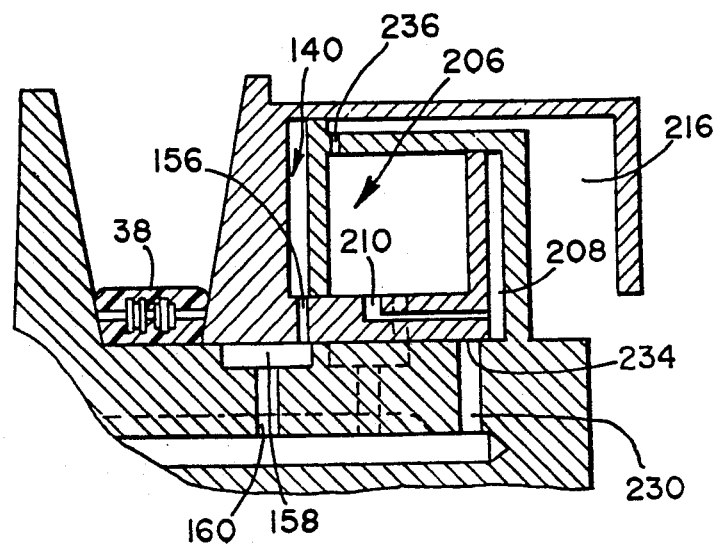
FIG. 7 is a view of the secondary servo of FIG. 5 configured to provide a CVT with its highest transmission ratio.

FIGS. 5 through 7 show another embodiment of the double acting secondary servo. One difference between the embodiment of FIGS. 5 through 7 and that of FIGS. 2 through 4 is the provision in FIGS. 5 through 7 of radial port 230 communicating between bore 162 and third chamber 208. The embodiment of FIG. 5 functions in essentially the same way as the embodiment of FIG. 2, except that there are two means of communication between first and third chambers 140, 208, as illustrated in FIG. 6, in order to keep the chambers filled with fluid. As with the embodiment of FIG. 2, port 210 provides such communication between chambers. However, a path of fluid communication is provided to third chamber 208 from axial bore 162 by port 230. Port 236 vents second chamber 206 or the balance can. When the balance can overflows, the fluid returns to the sump.

Referring now to FIG. 6, this embodiment works slightly differently than the embodiment of FIGS. 2-4. Although port 210 again is eclipsed by the inner periphery 194 in FIG. 6, as in FIG. 3, and thus blocked from communication with any chamber, port 230 remains in communication with third chamber 208. The first and third chambers 140 and 208 thus continue to apply equal clamping forces during the moment of this eclipse. Once port 210 shifts to the right past its eclipsed position (such as by fluid applied via port 176 to second chamber 206), and into communication with second chamber 206, which is the position illustrated in FIG. 7, the pressure between the second and third chambers 206 and 208 is essentially equalized. Chamber 206 remains pressurized through port 210 because pressure continues to be applied to third chamber 208 through the port 230. The fluid within the second chamber 206 can be pressurized to provide a counteracting hydraulic force.

When sheave flange 124 is at its high ratio limit of travel, as shown in FIG. 7, a clamping force is applied by supplying fluid to chamber 140, as in the embodiment of FIGS. 2 through 4. Fluid is vented from the balance can through port 236, or alternatively through port 176.

Figure 8:
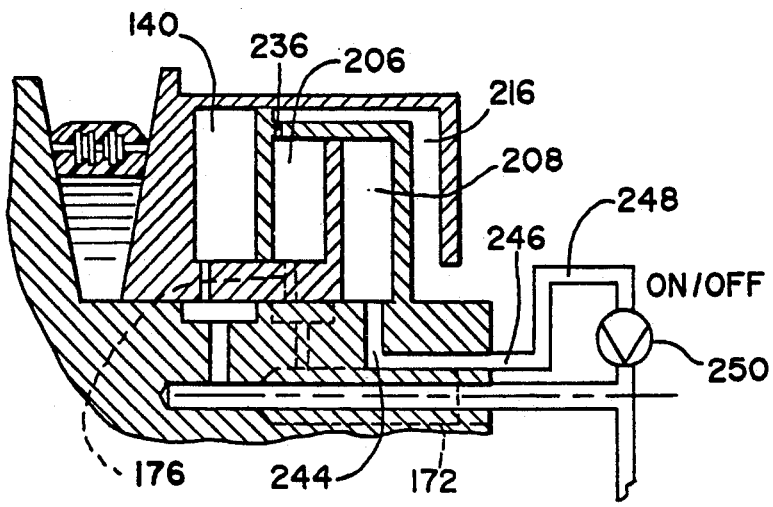
FIG. 8 is a schematic half-sectional detail view, taken through the center axis of another embodiment of a double, acting secondary sheave servo, configured to provide a CVT with an intermediate transmission ratio.

Referring now to FIG. 8, still another embodiment is illustrated. This embodiment omits port 210 of the embodiment of FIGS. 5 through 7, which provided interchamber communication. Port 230 is also replaced by radial port 244 and axial port 246 which connects third chamber 208 to an externally regulated valve 250 by a fluid path or conduit schematically indicated at 248. When a substantial clamping force is necessary, as during launch, valve 250 is opened, and the servo functions the same here as in previously described embodiments. After launch, or alternately after the torque converter is locked up, valve 250 is shifted to allow communication between third chamber 208 and a release vent or exhaust, thus reducing the fluid pressure in chamber 208. Chamber 206 is filled with fluid via port 176 to provide the centrifugal balance force, along with balance can 216.

Figure 9:
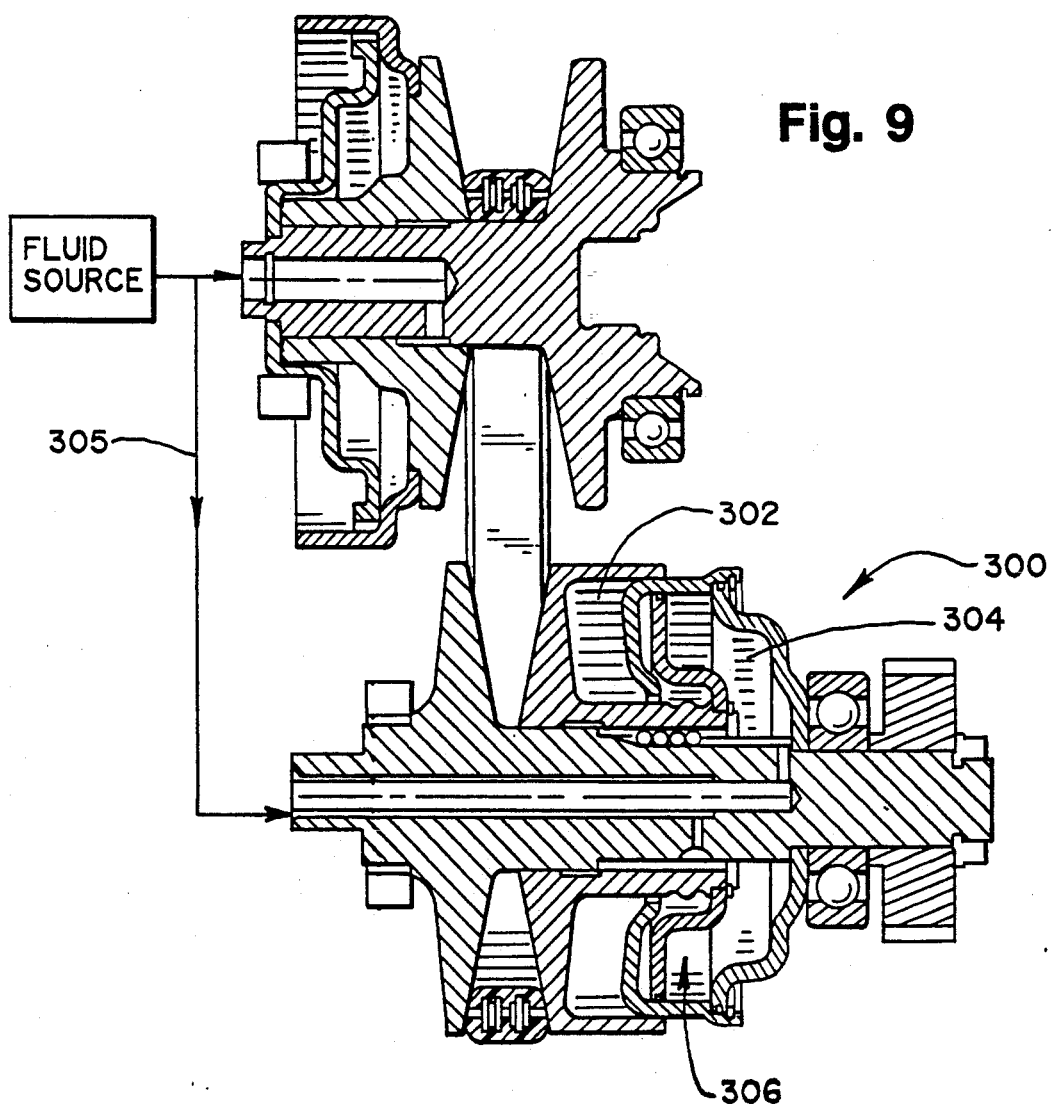
FIG. 9 is a sectional view, taken through the center axis of the primary and secondary sheave servos of another alternative embodiment.

Referring now to FIG. 9, another alternative embodiment is shown. FIG. 9 illustrates both the primary and secondary servos for the CVT. The belt and servos are illustrated in the high and low ratio conditions. The secondary servo, illustrated generally at 300, includes first and third fluid chambers 302, 304, for application and regulation of clamping pressure. The first and third chambers provide the necessary clamping force for the low ratio condition, as previously described for the other embodiments. Balance cavity 306, or second fluid chamber, provides a fluid reservoir for the high ratio conditions. A fluid connection 305 is provided between the fluid supply to the primary servo and the balance cavity 306. The fluid connection can comprise either a tubular connection or a series of conduits for fluid passage within the transmission casing, as used in the art for fluid passage. The fluid connection provides communication with the hydraulic source (not shown in FIG. 9 but described further below). Fluid at primary pressure is piped directly to the balance cavity through fluid connection 305 via appropriate valving means described below. At stall conditions, or start-up, no pressure is fed to the primary, as the primary pulley is at its lowest effective ratio. Since pressure is not being fed to the primary, pressure is also not being fed to the balance cavity through conduit 305, which allows the maximum clamping force on the secondary.

As the transmission ratio increases from the stall condition, the torque converter is locked and fluid pressure is fed to the primary sheave to provide an upshift to higher ratios of the CVT. As pressure is fed to the primary to provide the upshift, fluid pressure is also being fed to the balance cavity, which reduces the secondary clamping force. As the transmission is then downshifted, the secondary clamping force increases as the primary pressure decreases. Thus the embodiment of FIG. 9 can control the pressure to the balance cavity by utilizing the pressure to the primary apply servos. This control can be particularly useful in particular conditions as described further below.

Figure 10A:
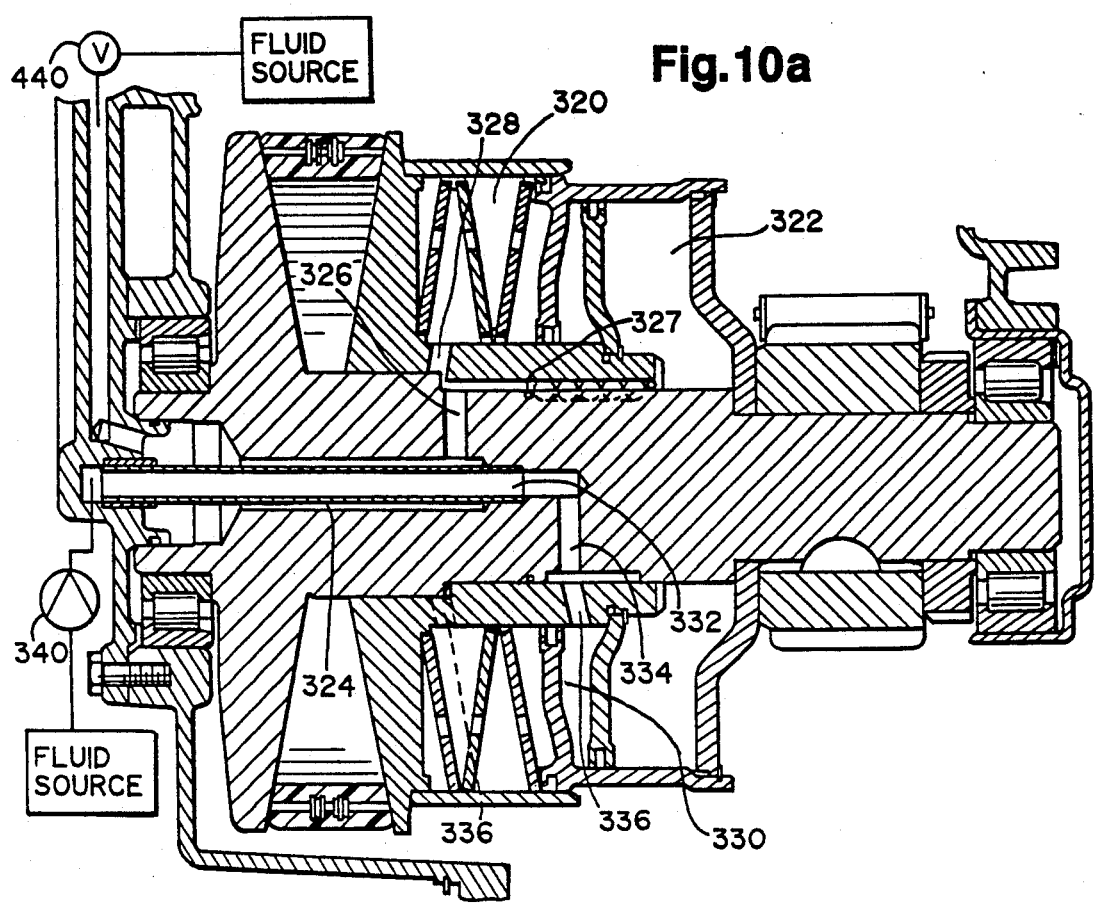
FIG. 10 is a sectional view taken through the center axis of the secondary servo of another alternative embodiment illustrating different ratios in FIGS. 10a and 10b.
Figure 10B:
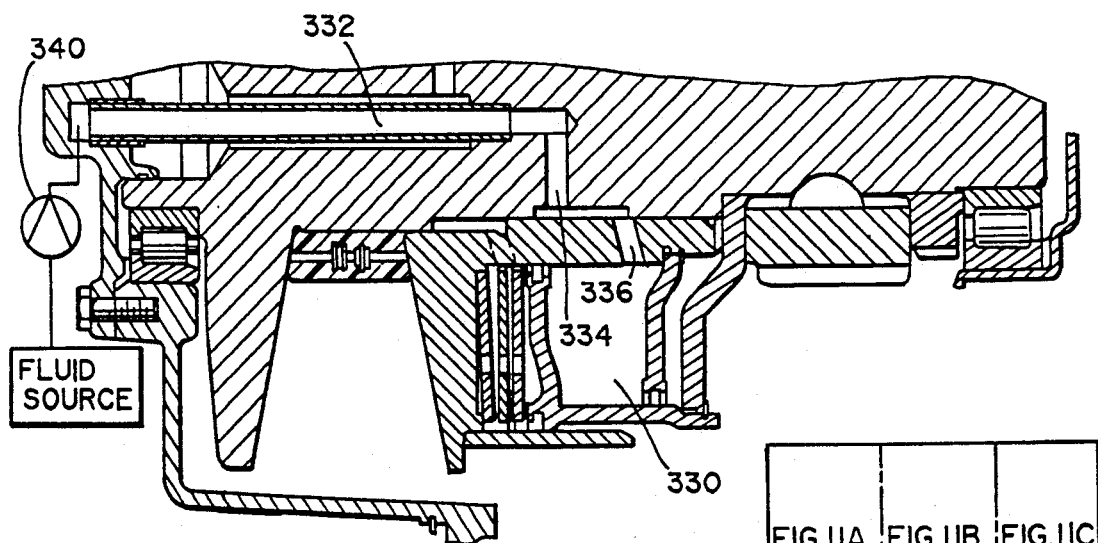

Another alternative embodiment is shown in FIG. 10. Here, the secondary servo arrangement is in the low transmission ratio (FIG. 10a) and high transmission ratio (FIG. 10b) conditions. The two fluid chambers 320 and 322 apply and regulate the necessary clamping force, as previously described. Fluid pressure is supplied to apply chambers 320, 322 through a fluid conduit, illustrated as ports 324, 326, 327, 328. Fluid is regulated by valve 440 (shown schematically) communicating between a fluid source and port 326. Fluid pressure is supplied to balance cavity 330 through the fluid conduit illustrated as ports 332, 334, 336. Fluid to this conduit is controlled by valve 340, shown only schematically in FIG. 10. Valves 340, 440 and the related controls are discussed further below with reference to FIGS. 11 and 12.

The pressure supplied to the particular cavities is thereby controlled by valves 340, 440. At launch, valve 440 is opened to provide sufficient clamping force to prevent belt slip. When a decrease in secondary force is desired, such as during an upshift to a higher ratio, valve 340 is opened and the balance cavity is supplied with fluid. The pressure in the balance cavity then reacts against the pressure in the other two chambers 320, 322, to reduce clamping force. At overdrive, when there is a high ratio for economical vehicle operation, valve 440 is cycled to control the pressure and thereby prevent overclamping of the belt. When an increase in secondary force is desired, such as during a downshift, valve 440 is opened and fluid is added to the two apply chambers 320, 322. Moreover for a rapid downshift, valve 340 may be cycled to help increase the secondary clamping force as required by the downshift strategy.

By allowing the fluid sources supplying valves 340, 440 to vary independently based on the engine conditions, torque input to the CVT, and CVT demands, overpressurization of the secondary servo can be avoided, and efficient operation of the CVT can be attained. One embodiment of the present invention includes a pressure fluid line (the secondary line) in communication with secondary apply valve 440 that may be regulated at or below the pressure of the general line of the hydraulic fluid source, and another pressure fluid line (the secondary balance line) in communication with secondary balance valve 340 that may be regulated at or below an intermediate pressure level that in turn is at or below the general line pressure of the hydraulic fluid source.

Figure 11A:
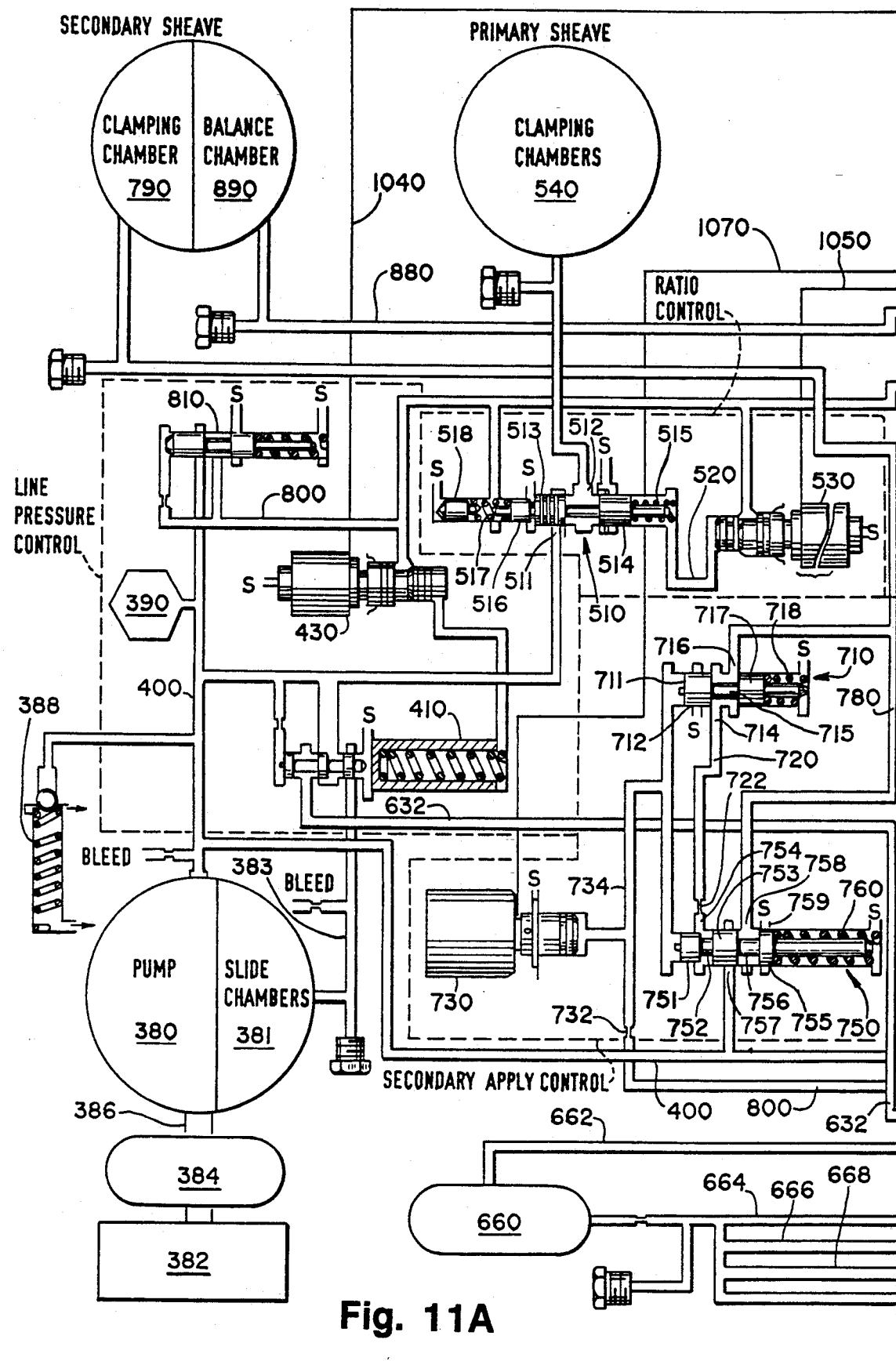
FIG. 11 is a piping and control system schematic layout of a CVT with the electronic and control arrangement of the present invention, shown in three portions, as FIGS. 11a, 11b and 11c.
Figure 11B:
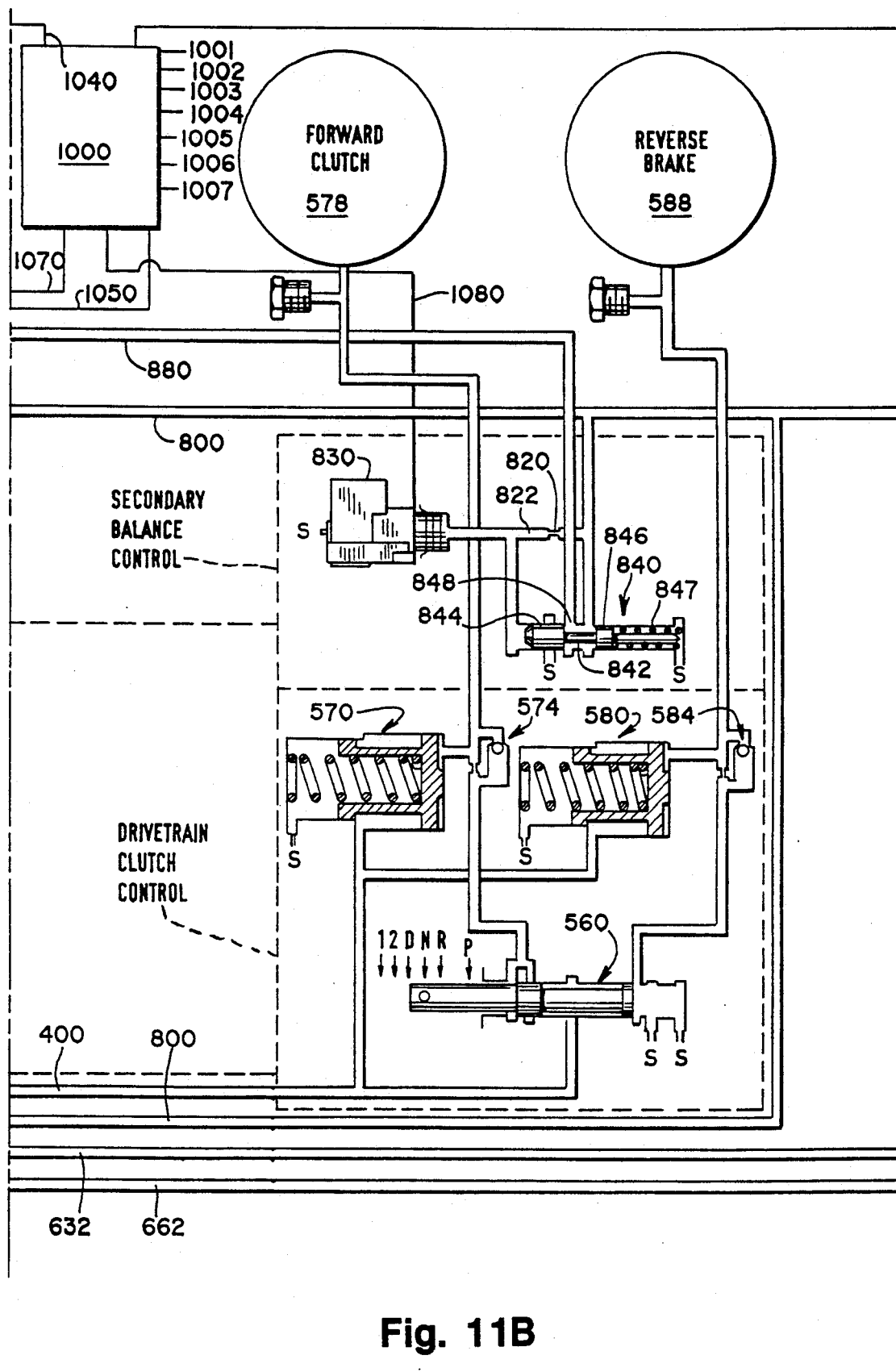
Figure 11C:
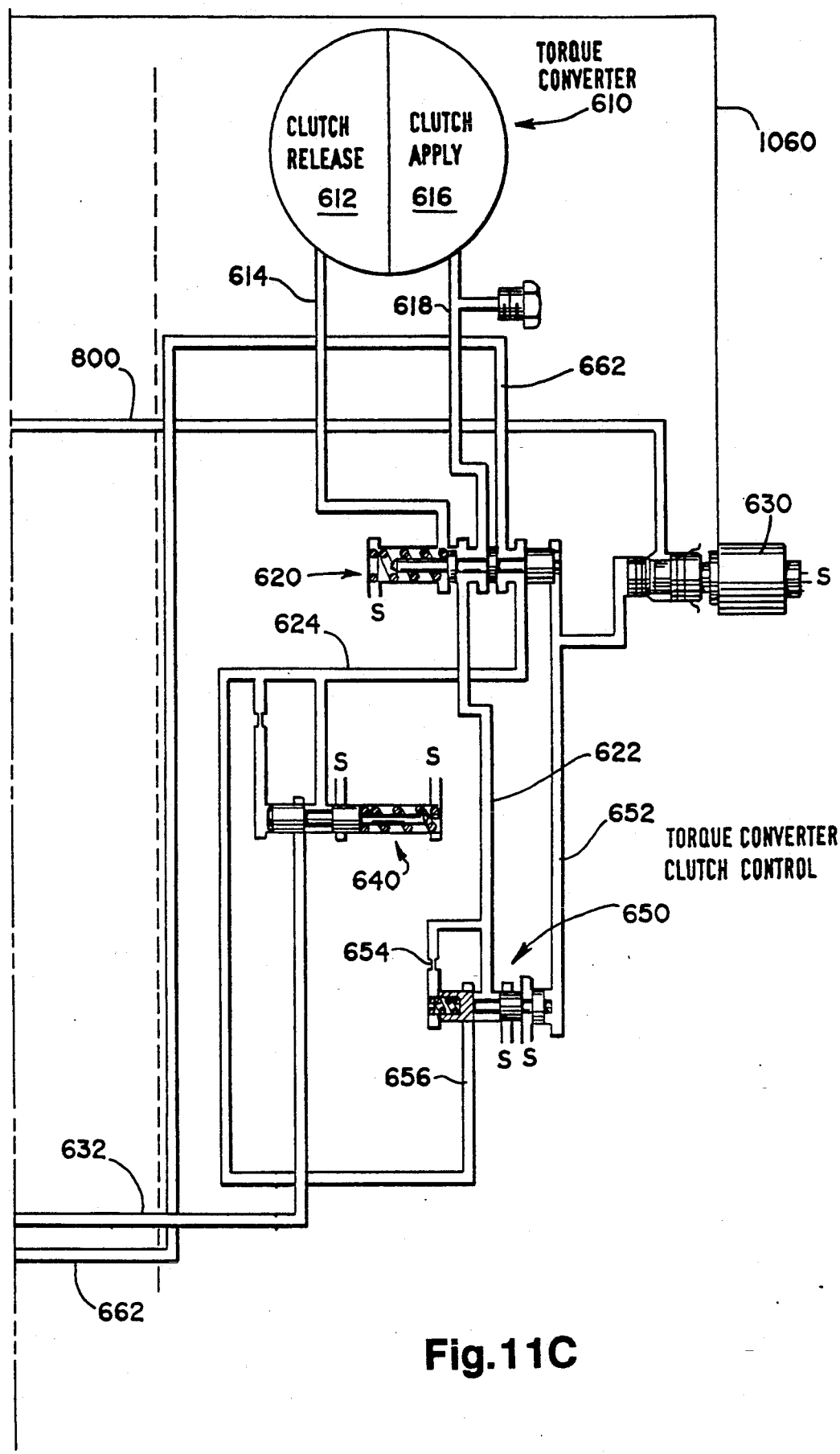

The control system for the foregoing embodiments is shown in its preferred embodiment in FIG. 11. Those skilled in the art will understand that some of the components of FIG. 11 are provided to illustrate the control strategy of the preferred embodiment of the present invention, and modifications may be made by those skilled in the art that are within the spirit and scope of the present invention.

Generally, the control strategy of the present invention involves substantially setting the pressures of the secondary balance chamber, primary apply chamber, and secondary apply chamber to efficiently operate the CVT and avoid excessive control pressures. One strategy (often employed at launch), involves substantially setting the secondary balance chamber pressure to that of the exhaust, substantially setting the general line pressure to the required secondary line pressure, and substantially setting the secondary line pressure to the general line pressure, which has a maximum allowable pressure. Another strategy, operative when the first strategy is inapplicable, involves substantially setting the secondary balance chamber pressure to the intermediate line pressure, calculating required secondary and primary pressures for efficient CVT operation, and when the required secondary pressure is greater than the required primary pressure, substantially setting the general line pressure to the required secondary line pressure and substantially setting the secondary line pressure to the general line pressure, which has a maximum allowable pressure. Another strategy, again operative when the first strategy is inapplicable, also involves substantially setting the secondary balance chamber pressure to the pressure required for the CVT operating under the given conditions, calculating required secondary and primary pressures for efficient CVT operation, and when the required secondary pressure is not greater than the required primary pressure, substantially setting the general line pressure to the required primary line pressure and substantially setting the secondary line pressure to the required secondary pressure.

To implement these strategies, the system in FIG. 11 includes three major subsystems: the torque converter control 600, the ratio control 500 and the belt clamping control (which includes the subsystems of the general line pressure control 401, secondary apply control 701, and secondary balance control 801). The subsystems of the belt clamping control subsystem are interrelated so that the secondary balance control 801 allows the balance chamber to alternate between pressures of the exhaust and the intermediate line, the general line pressure control 401 allows the general line to vary between a minimal acceptable pressure to prevent belt slip, such as 20 to 30 psi in the preferred embodiment (as outlined in U.S. patent application Ser. No. 07/752,064, filed Aug. 29, 1991 which is incorporated herein by reference), and the maximum allowable hydraulic source pressure, the ratio control 500 allows the primary chamber to vary between pressures of the general line and the minimal acceptable pressure to prevent belt slip (as outlined in U.S. patent application Ser. No. 07/752,064, filed Aug. 29, 1991 which is incorporated herein by reference), and the secondary apply control 701 allows the secondary apply chamber to vary between pressures of the general line and a minimal pressure to assure oil in the chamber, such as 35 psi in the preferred embodiment.

In addition to the three major subsystems of FIG. 11, there is conventional clutch control 550 for specifying the direction of vehicle travel, which comprises conventional manual control valve 560 operatively connected to forward and reverse accumulators 570, 580 respectively and general pressure line 400. Each accumulator communicates with respective check valves 574, 584, which in turn communicate, respectively, with forward clutch 578 and reverse brake 588.

Torque converter control subsystem 600 generally modulates pressure supplied to the torque converter clutch 610 for smooth engagement and disengagement and is conventional. The subsystem provides control by control valve 620, regulator valve 650, and valve control solenoid 630. Control valve 620 is operatively connected to valve control solenoid 630, and regulator valve 650 via clutch control line 652. Control valve 620 also communicates with clutch release 612 via control line 614, clutch apply 616 via control line 618, orifice 654 via line 622, and feed regulator valve 640 via regulated feed line 624. Control valve 620 finally communicates with transmission cooler 660 via lube pressure line 662, which is downstream of cooler 660, is also piped to belt lube line 664, final planet lube line 666, chain lube line 668, and other miscellaneous lines. Regulator valve 650 is operatively connected to feed regulator valve 640 via regulated feed pressure line 656. Feed regulator valve 640 in turn communicates with general line pressure regulator valve 410 (and general line 400) via feed line 632. The valves are preferably spool valves and the valve control solenoid 630 is preferably a normally open pulse width modulated (PWM) solenoid. Regulator valve 640 is also preferably a 90 psi limit valve for regulating the clutch feed line pressure.

The torque converter clutch 610 is applied in the following manner. Valve control solenoid 630 is closed via a control signal from electronic control unit 1000 via control line 1060, which causes control valve 620 to shift to the right (as shown in FIG. 11), redirecting fluid to torque converter apply 616, and allows maximum regulation by regulator valve 650 of the pressure supplied by feed regulator valve 640. Pressure in clutch apply line 618 may be increased by decreasing the duty cycle of valve control solenoid 630 to less than 100%, thereby increasing the pressure supplied by regulator valve 650. This subsystem is designed preferably to regulate the torque converter clutch apply pressures in line 618 to between 30 to 90 psi and regulator valve 650 in particular is preferably designed so the full 90 psi pressure from regulator valve 640 can be supplied to line 618 before control valve 620 shifts back to the left by way of the decreasing duty cycle of valve control solenoid 630.

Ratio Control subsystem 500 is also conventional and generally modulates the pressure supplied to the primary apply chambers 540. The subsystem generally comprises control valve 510 operatively connected to ratio valve control solenoid 530. Ratio control valve 510 is supplied fluid pressure by general pressure line 400 at port 511 and communicates with primary sheave apply chambers 540 via port 512 and primary pressure line 544. Land 514, adjacent an exhaust port, is biased to the left by biasing means 515 and is also affected by valve control solenoid 530 by way of pressure control line 520. Land 513, adjacent port 511 is connected to land 516, which is adjacent an exhaust port as shown. Land 516 is biased to the right by biasing means 517, which is adjusted by adjustment means 518 (including a set screw adjustable in a well known manner), and is also affected by pressure in intermediate pressure line 800. Ratio control valve is preferably a two stage spool valve and valve control solenoid 530 is preferably a normally closed PWM solenoid valve.

The ratio of the belt is controlled by altering the pressure in the primary apply chambers 540 in the following conventional manner of closed loop control. Electronic control unit 1000 inputs primary sheave location or engine speed 1003 from conventional sensors and using a conventional control algorithm, and sends a generated ratio control signal via line 1050 to valve control solenoid 530. The valve adjusts in response to the signal to provide the appropriate pressure to the primary servo. In this manner, the ratio may be adjusted by way of primary line 544 pressure that may be at or below general line 400 pressure (discussed further below).

The final subsystem, that of belt clamping control, includes the general line pressure control, secondary apply chamber pressure control, and secondary balance chamber pressure control. The general line pressure is created in general line 400 by variable displacement pump 380, which draws fluid from sump 382 through filter 384 via pump suction line 386. Line pressure relief valve 388 communicates with general line 400 to provide a maximum allowable pressure therein. Pressure sensor 390 is connected to control unit 1000 via a conventional line (not shown) to provide a feedback signal described in greater detail below. General line 400 supplies pressure to intermediate line regulator valve 810 which allows communication with intermediate line 800 up to a maximum predetermined pressure for intermediate line 800, which in the preferred embodiment is 60 psi. General line 400 also supplies secondary regulator valve 750, described further below.

General line pressure control 401 generally modulates the general line pressure between the pressures of the maximum allowable line pressure dictated by relief valve 388, and a minimal acceptable pressure for the system. This minor subsystem provides control by general line pressure regulator valve 410 and general line pressure control solenoid 430. Intermediate line 800 feeds general line pressure control solenoid 430. Line pressure control solenoid 430 is operatively connected to line pressure regulator valve 410. Valve 410 in turn communicates with pump slide pressure line 383 (leading to slide chamber 381) and torque converter feed line 632. Line pressure control solenoid 430 is controlled by electronic control unit 1000 by general line pressure control signals on line 1040.

In the preferred embodiment, line pressure control solenoid 430 is a PWM solenoid normally open. Regulator valve 410 is preferably a spool valve configured as shown. For the preferred embodiment, the maximum line pressure in general line 400 is approximately 350 psi and the intermediate line 800 is regulated at approximately 60 psi.

Secondary balance control 801 generally supplies pressure to the secondary balance chamber 890. This minor subsystem provides control by balance control valve 840 and balance control solenoid 830. Intermediate pressure line 800 communicates with balance control valve 830 via orifice 820. Operatively connected to control solenoid 830 via balance control line 822 is balance control valve 840, which comprises spool 842, lands 844, 846, biasing means 847 and exhaust port 848. The balance control valve in turn supplies pressure via port 848 by balance line 880. Valve control solenoid 830 is preferably an on/off 2-way solenoid, although a 3-way solenoid may be used.

The secondary servo balance chamber can thereby be operated in the following manner. Control unit 1000 sends a signal via balance control line 1080 to valve control solenoid 830 causing the solenoid to close and causing pressure to build up in control line 822 which causes land 844 to move to the right as shown, and making spool 842 communicate with intermediate line 800 and port 848 thereby equilibrating the pressures of lines 800 and 880. Alternatively, valve control solenoid 830 may be opened by control signals from control line 1080 which allows balance control valve 840 to translate to the left by way of biasing means 847 and a pressure differential on land 844 by way of flow control orifice 820. This results in balance line 880 communicating with exhaust port 848 whereby the fluid in balance chamber 890 may go to the sump via exhaust port 848 and return lines (not shown).

Secondary apply control 701 generally modulates pressure supplied to the secondary apply chambers 790. This minor subsystem provides control by secondary bypass valve 710, secondary regulator valve 750, and secondary control solenoid 730. Intermediate pressure line 800 feeds secondary valving control solenoid 730 via orifice 732. Control solenoid 730 is also operatively connected to secondary bypass valve 710 and secondary regulator valve 750 via secondary control line 734. Secondary bypass valve 710 includes land 711 adjacent exhaust port 712, spool 715, adjacent port 714 (communicating with secondary feedback line 720), port 716 (communicating with secondary line 780), land 717, and biasing means 718. Secondary regulator valve 750 comprises land 751, spool 752, adjacent port 754 (communicating with secondary feedback line 720 via orifice 722), land 753, port 757 (communicating with general pressure line 400), spool 756, port 758 (communicating with secondary line 780), land 755, exhaust port 759 (communicating with sump 382 via return lines not shown), and biasing means 760. It is by this preferred embodiment that the secondary line 780 may be regulated at a different pressure than the pressure in general line 400.

In the preferred embodiment depicted in FIG. 11, valving control solenoid 730 is a normally open PWM solenoid. The preferred embodiment operates in the following manner. If no control signal occurs from secondary control line 1070, valving control solenoid 730 is open and pressure in control line 734 allows bypass valve 710 and regulator valve 750 to shift to the left. Feedback line 722 is then deactivated by communication with exhaust port 712 of bypass valve 710, and line pressure port 757 is in full communication with secondary line port 758 to provide secondary line 780 with general line 400 pressure to thereby make secondary pressure approximately equal to general line pressure. As the valving control solenoid 730 duty cycle begins to increase, responsive to control signals from secondary control line 1070, the valving assembly positioning will not change until approximately 15 psi due to the sizing of valve lands and biasing means. At this point, because of the sizing of valve lands and biasing means, bypass valve 710 shifts enough to allow secondary pressure to act on the regulator valve 750, thereby allowing secondary line 780 to communicate with general pressure line 400 as modulated by feedback line 722 pressure. As the valving control solenoid 730 duty cycle increases further, both bypass valve 710 and regulator valve 750 shift to the right as shown in FIG. 11 regulating pressure further, allowing communication of secondary line 780 with feedback line 720 and port 754 of regulator valve 750. At this point regulator valve 750 can modulate the pressure in secondary line 780 by way of secondary feedback line 720 and orifice 722. This feedback path (through orifice 722 and port 754) adds to the net pressure exerted at the left end of regulator valve 750. If the secondary line 780 pressure becomes too great, the dimensional difference between lands 751 and 753 and the force from biasing means 760 allows spool 756 to translate to the right and allow secondary line 780 to communicate with exhaust port 759. If the secondary line 780 pressure becomes too small, spool 756 may travel to the left and allow secondary line 780 to communicate with line pressure port 757. In this preferred embodiment, secondary pressure can be controlled from approximately 130 to 35 psi.

As can readily be appreciated, the present invention allows for a secondary line 780 pressure that can be at the general line 400 pressure, as well independent of this pressure. The present invention therefore also includes a control strategy and method for efficient operation of the CVT which also avoids overpressurization of the secondary servo.

The control system schematic is also depicted in FIG. 11. The control strategy, discussed further below, is implemented by electronic control unit 1000 that has inputs of signal information from conventional sensors, including those indicating the manual valve (first, second, overdrive, neutral, reverse, park) position 1001, performance switch position 1002, engine speed 1003, throttle (accelerator) position 1004, oil temperature 1005, primary sheave speed 1006, and secondary sheave speed 1007. Respective outputs are connected to, among others, line pressure control line 1040, ratio control line 1050, torque converter clutch control line 1060, secondary apply control line 1070, and secondary balance control line 1080. The electronic control unit 1000 calculates whether to increase or decrease the pressure in the ratio control line 520 and torque converter clutch control line 822 and sends the appropriate signals to the respective valve control solenoids 530, 630 to effect this control. The complete control system is configured to generate appropriate control signals to achieve the optimum points on the engine performance and economy map, which is based on the chosen engine driving the torque converter and CVT and supplied by the designer of the particular engine.

Electronic control unit 1000 also controls the general line 400 pressure via control line 1040, the secondary apply line 780 pressure via control line 1070, and the secondary balance line 880 pressure via control line 1080. By controlling these respective lines according to the following control strategy, conventional hydraulic control pressures may used in the system and overpressurization of the secondary chambers, with the accompanying problems of control inefficiency, noise, and increased frequency of mechanical failure, may be avoided. As always these goals are obtained in addition to the overall consideration of preventing belt slip thereby avoiding damage to the belt, sheaves and CVT housing without overtensioning the belt so as to maintain CVT transmission efficiency.

Figure 12:
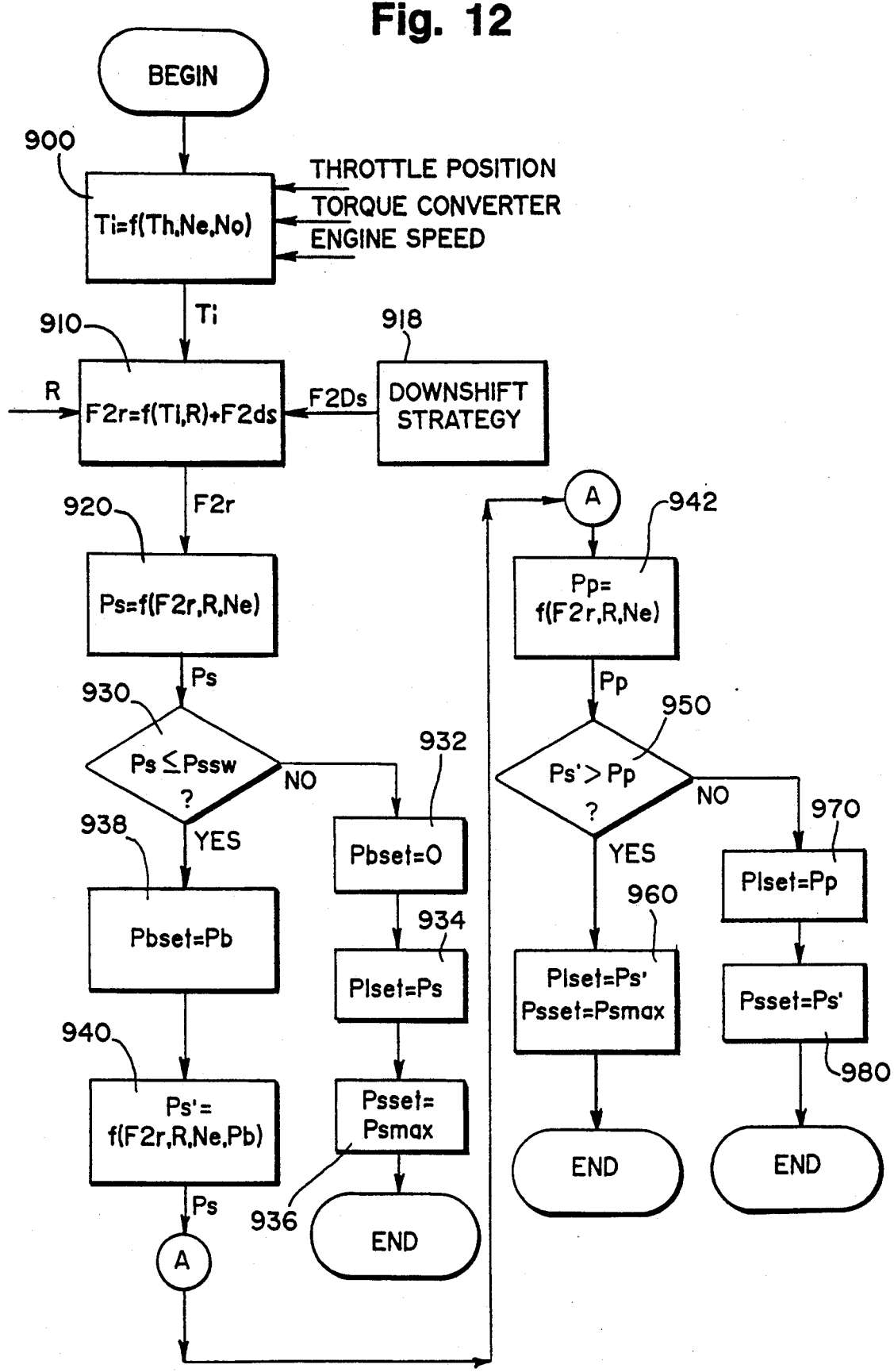
FIG. 12 is a flow diagram of several strategies for controlling the secondary servo apply and balance chambers of the present invention.

FIG. 12 consists of a flow chart describing the control strategy for controlling the belt clamping forces of a CVT. This control loop is executed periodically by electronic control unit 1000 and in the preferred embodiment it is executed by a timed interrupt to the normal iterations of other control operations executed by electronic control unit 1000. It is assumed that the engine is running and manual valve 560 is engaged in a position other than neutral or park. Upon execution of the interrupt, control passes to operation box 900, and the electronic control unit 1000 determines the CVT input torque, Ti, from inputs of the throttle position, Th, torque converter output speed, No, and engine speed, Ne. The operation in 900 generally entails determining the engine torque using the throttle position, Th, and engine speed, Ne, via a schedule or look up table and interpolation between discrete points. The map or table is stored in the electronic control unit memory and has effectively a series of throttle position curves on a plane where the engine speed can be the abcissa or ordinate and the engine torque is represented on the other axis thereby allowing for determination of the engine torque. Such a look up table is conventional and specific to the engine used, and the particular routine used is well known in the art. The CVT input torque, Ti, is then calculated by a method of computation conventional and well known in the art using inputs including engine speed, Ne, torque converter output speed, No, and known torque converter efficiencies.

Upon determining the CVT input torque, Ti, control passes to operation box 910, which determines the required secondary sheave clamping force, F2r, by combining the following two components. Electronic control unit 1000 calculates the belt clamping force F2r by summing the following components. The first force component, downshift force F2ds, is a function of the downshift strategy employed in the particular CVT drive and system utilized under the specific operating conditions, as depicted by operation box 918. F2ds is determined by the downshift strategy which sets a secondary force and controls ratio valve 510 to prevent belt slippage on the primary sheave during downshift. Such a downshift strategy is described in U.S. patent application Ser. No. 07/752,064, filed Aug. 29, 1991, which is incorporated herein by reference. The second component of F2r is calculated from the input torque Ti and belt ratio R (determined, for example, by the primary shaft and secondary shaft speed from appropriately placed sensors) by reference to a schedule or look up table and with interpolation between discrete points. Determination of this second component is conventional and well known in the art.

Control is then passed to operation box 920 which determines the required secondary apply pressure Ps. Electronic control unit 1000 determines Ps as a function of the required secondary sheave clamping force F2r, belt ratio R, and engine speed Ne. In particular, the belt ratio R and engine speed Ne are used to determine the extent that the required secondary apply pressure will be generated from the centrifugal effects of the oil in the secondary servo, which is determined by the physical design of the CVT cavities. This centrifugal effect is thus determined from a CVT-specific map or schedule stored in electronic control unit 1000 memory using interpolation from discrete points as is well known in the art. Ps may then be determined from a look up table using interpolation between discrete values referenced by the centrifugal effects value and the required belt clamping force F2r to allow for efficient CVT functioning. This method of computation is conventional and well known in the art. Following calculation of Ps in operation box 920, control passes to decision box 930.

At decision box 930, electronic control unit 1000 decides whether to pressurize the secondary balance cavity. To preclude overpressurization of the hydraulic lines and cavities of the secondary, this calculated required secondary apply pressure is compared to a setpoint specific to the CVT system, the switching pressure Pssw. In the preferred embodiment, this setpoint is determined by first calculating the torque capacity of the CVT when the hydraulic system is at its maximum pressure output and pressure is applied to the secondary balance cavity. The using this calculated torque, but assuming no pressure to the balance chamber, a secondary apply chamber pressure that is required for this torque is calculated thereby determining switching pressure, Pssw. Making such a switching pressure setpoint determinative of pressurizing the secondary balance cavity thereby reduces the centrifugal effects of the oil in the secondary but avoids excessive system pressures with the inherent inefficiencies, noise, and other disadvantageous effects.

If the required secondary apply pressure Ps is greater than the switching pressure Pssw, then control passes to operation box 932. If this condition is met, the vehicle may be at launch conditions, when secondary apply line 780 should have a high pressure and balance line 880 should have a low pressure. Accordingly balance control valve 830 is operated to set the pressure in balance line 880 to exhaust, as depicted in operation box 932; then general line 400 pressure is set to the required secondary apply pressure Ps by way of controlling the line pressure control solenoid 430, as displayed in operation box 934; and then secondary apply line 780 is set to the general line 400 pressure by way of secondary valving control solenoid 730, as depicted in operation box 936. Following completion of operation box 936, these control settings are maintained and electronic control unit 1000 will cycle through other control operations until an interrupt again signals it to execute the control loop, at which time it begins at operation box 900.

If at decision box 930, the required secondary apply pressure Ps is less than or equal to the switching pressure, Pssw, then control passes to operation box 938. If this condition is met the vehicle is at such a state where pressure can be applied to the balance cavity without concern for going above the maximum pressure for the hydraulic system. At operation box 938, pressure from intermediate line 800 is applied to the secondary balance cavity via balance line 880 at balance pressure Pb. The balance line 880 pressure is set to the intermediate line pressure.

Control is then passed to operation box 940, where a second required secondary apply pressure Ps' is determined by the electronic control unit 1000 much the same way as previously discussed with respect to operation box 920. However, an additional input variable, balance line pressure Pb is also used to reference the pertinent schedule or map of the required secondary apply pressure function to account for the counteracting forces now present from the pressurized balance cavity. As in operation box 920, the method of computation is conventional and well known in the art.

Control is then passed to operation box 942, where the required primary servo apply pressure Pp is calculated by electronic control unit 1000 as a function of belt ratio R, required secondary sheave clamping force F2r, and engine speed Ne. To maintain a desired belt ratio, a primary to secondary force ratio must be maintained. For example, in overdrive this ratio has been experimentally determined for the preferred embodiment to be approximately 1.7. Pp is thus determined by using the engine speed Ne to determine the centrifugal force in the primary servo opposing the primary apply pressures and then using the desired force ratio to obtain Pp by way of interpolation between discrete points from a map or look up table, accounting for the determined opposing centrifugal force. This method is conventional and well known in the art.

Following completion of the calculation of Pp, control passes to decision box 950. If second required secondary pressure Ps' is less than or equal to required primary pressure Pp, then control passes to operation box 970. This occurs under such circumstances as when in overdrive, the primary sheave radius is large and input torque is low and the secondary has high centrifugals, thus little pressure is required in the secondary apply chambers to preclude belt slippage. At operation box 970, general line 400 pressure is set to the required primary pressure Pp via line pressure control solenoid 430, thereby affecting primary line 544 pressure via ratio valve 510. Control is then passed to operation box 980, where secondary line 780 pressure is set to the second required secondary pressure Ps' via valving control solenoid 730 and regulator valve 750. This strategy thereby allows the CVT to more easily achieve the primary forces necessary to hold an overdrive (high transmission) ratio and allows reduction in the secondary force thereby making it easier in turn to achieve the desired primary to secondary clamping force ratio. Overpressurization of the secondary is avoided thereby avoiding belt frictional losses and pumping losses. Following completion of operation box 980, these control settings are maintained and electronic control unit 1000 will cycle through other control operations until an interrupt again signals it to execute the control loop, at which time it begins at operation box 900.

If at decision box 950, the second required secondary line pressure Ps' is greater than required primary line pressure Pp, then control passes to operation box 960. At operation box 960, general line 400 pressure is set to the second required secondary line pressure Ps' by way of line pressure control solenoid 430, and secondary apply line 780 is set to the general line 400 pressure by way of secondary valving control solenoid 730 so that full line pressure is directed to the secondary servo apply chambers. Following completion of operation box 960, these control settings are maintained and electronic control unit 1000 will cycle through other control operations until an interrupt again signals it to execute the control loop, at which time it begins at operation box 900.

While specific embodiments of the current invention are illustrated, it will be understood, of course, that the invention is not limited to these embodiments. For example, the foregoing control strategies and implementing system may readily be applied to a CVT with a start clutch and an associated control subassembly rather than the depicted torque converter 610 and clutch control subassembly 600. Specifically such a start clutch CVT would lack valves 620, 640, 650 and would have a start clutch control valve supplied at one end land by intermediate line 800 and supplied at the other end land by a clutch control solenoid (such as a PWM solenoid, normally open) that is operatively connected to intermediate line 800. The central land area of the clutch control valve (separated from respective end land areas by respective exhaust land areas) operatively communicates with general line 400 and a clutch pressure line that controls the start clutch via a conventional manual valve and commonly used forward and reverse shift servo arrangement upon translation of the control valve. In other respects the piping diagram of a start clutch arrangement would generally be the same as FIG. 11.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Thus while the invention has been described with reference to particular embodiments, modifications of structure, sequence, materials and the like would be apparent to those skilled in the art, yet still fall within the scope of the invention.

What is claimed is:

1. A continuously variable transmission system to provide transmission of torque from a torque input means to a torque output means, comprising:

rotatable input and output shafts;

drive means for drivingly coupling said input shaft with said output shaft, said drive means including a first variable pulley rotatable with said input shaft, a second variable pulley rotatable with said output shaft, and a belt means coupling said first and second variable pulleys, each of said first and second variable pulleys having a fixed sheave and a movable sheave;

first biasing means for continuously biasing together said fixed and movable sheaves of said first variable pulley, second biasing means for continuously biasing together said fixed and movable sheaves of said second variable pulley;

said first biasing means including at least one fluid chamber having fluid access to a source of pressurized hydraulic fluid via a primary line;

said second biasing means including a plurality of fluid chambers closed to the atmosphere and having fluid access to a source of pressurized hydraulic fluid via a secondary line, addition and exhaustion of fluid from said fluid chambers being effective to cause relative movement of said movable sheave; and a valve means for regulation of fluid flow to said plurality of fluid chambers of said secondary pulley in communication with said source of pressurized hydraulic fluid, said valve means operative to regulate the secondary line pressure below the pressure of said source and distinct from the primary line pressure.

2. A continuously variable transmission system to provide transmission of torque from a torque input means to a torque output means, comprising:
  rotatable input and output shafts;
  drive means for drivingly coupling said input shaft with said output shaft, said drive means including a first variable pulley rotatable with said input shaft, a second variable pulley rotatable with said output shaft, and a belt means coupling said first and second variable pulleys, each of said first and second variable pulleys having a fixed sheave and a movable sheave;
  first biasing means for continuously biasing together said fixed and movable sheaves of said first variable pulley, second biasing means for continuously biasing together said fixed and movable sheaves of said second variable pulley;
  said first biasing means including at least one fluid chamber having fluid access to a source of pressurized hydraulic fluid via a primary line;
  said second biasing means including a plurality of fluid chambers including first, second, and third fluid chambers having fluid access to a source of pressurized hydraulic fluid via a secondary line, addition and exhaustion of fluid from said fluid chambers being effective to cause relative movement of said movable sheave; and
  a valve means for regulation of fluid flow to said plurality of fluid chambers of said secondary pulley in communication with said source of pressurized hydraulic fluid, said valve means operative to regulate the secondary line pressure below the pressure of said source and distinct from the primary line pressure, with the first and third chambers being in fluid communication with the valve means.

3. The continuously variable transmission system of claim 2 further comprising a valve means operatively interconnecting said first and second chambers.

4. A continuously variable transmission system with a primary coupling means and primary line in fluid communication therewith, a secondary coupling means and secondary line in fluid communication therewith, said secondary coupling means including a closed balance means in fluid communication with an intermediate line, and a general line in fluid communication with the primary line, the secondary line, and intermediate line, and means for controlling the clamping force of said secondary coupling means in response to the input torque, drive ratio, engine speed, and downshift strategy employed, said means for controlling the clamping force of said secondary coupling means comprising:
  means for ascertaining a required secondary line pressure for the input torque, drive ratio, engine speed, downshift strategy employed, and pressure of the secondary balance means in the continuously variable transmission;
  means for ascertaining a required primary line pressure for the input torque, drive ratio, engine speed, and downshift strategy employed in the continuously variable transmission;
  means for substantially setting the general line pressure to the required primary line pressure responsive to said required primary line pressure greater than or equal to said required secondary pressure; and
  means for substantially setting the secondary line pressure to the required secondary line pressure responsive to said required primary line pressure greater than or equal to said required secondary line pressure.

5. A continuously variable transmission system with a primary coupling means and primary line in fluid communication therewith, a secondary coupling means and secondary line in fluid communication therewith, said secondary coupling means including a balance means in fluid communication with an intermediate line, and a general line in fluid communication with the primary line, the secondary line, and intermediate line, and means for controlling the clamping force of said secondary coupling means in response to the input torque, drive ratio, engine speed, and downshift strategy employed, said means for controlling the clamping force of said secondary coupling means comprising:
  means for ascertaining a required secondary line pressure for the input torque, drive ratio, engine speed, downshift strategy employed, and pressure of the secondary balance means in the continuously variable transmission;
  means for ascertaining a required primary line pressure for the input torque, drive ratio, engine speed, and downshift strategy employed in the continuously variable transmission; and
  means responsive to the required secondary line pressure greater than the required primary line pressure for substantially setting the general line pressure to the required secondary line pressure and for substantially setting the secondary line pressure to the general line pressure.

6. A continuously variable transmission system with a primary coupling means and primary line in fluid communication therewith, a secondary coupling means and secondary line in fluid communication therewith, said secondary coupling means including a balance means in fluid communication with an intermediate line, a general line in fluid communication with the primary line, the secondary line, and intermediate line, and means for controlling the clamping force of said secondary coupling means in response to the input torque, drive ratio, engine speed, and downshift strategy employed, said means for controlling the clamping force of said secondary coupling means comprising:
  means for ascertaining a first required secondary line pressure for the input torque, drive ratio, engine speed, and downshift strategy employed in the continuously variable transmission;
  means for comparing the first required secondary line pressure with a switching pressure setpoint;
  means responsive to the first required secondary pressure greater than the switching pressure setpoint for substantially exhausting the secondary balance means;
  means responsive to the first required secondary pressure greater than the switching pressure setpoint for substantially setting the general line pressure to the first secondary pressure;
  means responsive to the first required secondary pressure greater than the switching pressure setpoint for substantially setting the secondary line pressure to the general line pressure;
  means responsive to the first required secondary pressure lesser than or equal to the switching pressure setpoint for substantially setting the secondary balance means pressure to the intermediate line pressure;
  means for ascertaining a second required secondary line pressure for the input torque, drive ratio, engine speed, downshift strategy employed, and secondary balance means pressure in the continuously variable transmission;

means for ascertaining a required primary line pressure for the input torque, drive ratio, engine speed, and downshift strategy employed in the continuously variable transmission;

means for comparing the second required secondary line pressure with the required primary line pressure;

means responsive to the required primary line pressure greater than o equal to said second required secondary pressure for substantially setting the general line pressure to the required primary line pressure; and means responsive to the required primary line pressure greater than or equal to said second required secondary pressure for substantially setting the secondary line pressure to the second required secondary line pressure.

7. A continuously variable transmission system with a primary coupling means and primary line in fluid communication therewith, a secondary coupling means and secondary line in fluid communication therewith, said secondary coupling means including a balance means in fluid communication with an intermediate line, a general line in fluid communication with the primary line, the secondary line, and intermediate line, and means for controlling the clamping force of said secondary coupling means in response to the input torque, drive ratio, engine speed, and downshift strategy employed, said means for controlling the clamping force of said secondary coupling means comprising:

means for ascertaining a first required secondary line pressure for the input torque, drive ratio, engine speed, and downshift strategy employed in the continuously variable transmission;

means for comparing the first required secondary line pressure with a switching pressure setpoint;

means responsive to the first required secondary pressure greater than the switching pressure setpoint for substantially exhausting the secondary balance means;

means responsive to the first required secondary pressure greater than the switching pressure setpoint for substantially setting the general line pressure to the first secondary pressure;

means responsive to the first required secondary pressure greater than the switching pressure setpoint for substantially setting the secondary line pressure to the general line pressure;

means responsive to the first required secondary pressure lesser than or equal to the switching pressure setpoint for substantially setting the secondary balance means pressure to the intermediate line pressure;

means for ascertaining a second required secondary line pressure for the input torque, drive ratio, engine speed, downshift strategy employed, and secondary balance means pressure in the continuously variable transmission;

means for ascertaining a required primary line pressure for the input torque, drive ratio, engine speed, and downshift strategy employed in the continuously variable transmission;

means for comparing the second required secondary line pressure with the required primary line pressure;

means responsive to the required primary line pressure lesser than said second required secondary pressure for substantially setting the general line pressure to the second required secondary line pressure; and means responsive to the required primary line pressure lesser than said second required secondary pressure for substantially setting the secondary line pressure to the general line pressure.

* * * * *

UNITED STATES PATENT AND TRADEMARK OFFICE
CERTIFICATE OF CORRECTION

PATENT NO. : 5,269,726
DATED : December 14, 1993
INVENTOR(S) : Glenn E. Swanson et al.

It is certified that error appears in the above-indentified patent and that said Letters Patent is hereby corrected as shown below:

On title page, item [54] and col. 1, line 4, of the title please delete "FOR" and substitute --OF--.

Column 1, line 3 of the title please delete "FOR" and substitute --OF--.

In column 5, line 33, after "double" delete the ",".

In column 18, line 23, delete "The" and substitute --Then--.

Col. 23, line 12
delete "o" and substitute --or--.

Signed and Sealed this

Eighth Day of November, 1994

Attest:

BRUCE LEHMAN

*Attesting Officer*      *Commissioner of Patents and Trademarks*